United States Patent
Rivers et al.

(10) Patent No.: US 8,048,827 B2
(45) Date of Patent: *Nov. 1, 2011

(54) KINETIC GAS HYDRATE INHIBITORS IN COMPLETION FLUIDS

(75) Inventors: Gordon T. Rivers, Houston, TX (US); Jun Tian, League City, TX (US); John B. Trenery, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/641,526

(22) Filed: Dec. 18, 2009

(65) Prior Publication Data

US 2010/0144559 A1 Jun. 10, 2010

Related U.S. Application Data

(63) Continuation-in-part of application No. 11/832,741, filed on Aug. 2, 2007, now Pat. No. 7,638,465.

(60) Provisional application No. 60/835,285, filed on Aug. 3, 2006.

(51) Int. Cl.
*C09K 8/82* (2006.01)
*E21B 43/25* (2006.01)
*E21B 43/16* (2006.01)

(52) U.S. Cl. .................. 507/90; 166/305.1; 175/65

(58) Field of Classification Search ............ 507/90; 166/305.1; 175/65
See application file for complete search history.

(56) References Cited

U.S. PATENT DOCUMENTS

| | | | |
|---|---|---|---|
| 3,988,246 A | 10/1976 | Hartfiel | |
| 4,116,275 A | 9/1978 | Butler et al. | |
| 6,035,933 A | 3/2000 | Khalil et al. | |
| 6,080,704 A | 6/2000 | Halliday et al. | |
| 6,165,945 A | 12/2000 | Halliday et al. | |
| 6,355,600 B1 | 3/2002 | Norfleet et al. | |
| 6,596,911 B2 | 7/2003 | Przybylinski et al. | |
| 6,756,345 B2 | 6/2004 | Pakulski et al. | |
| 6,855,671 B2 | 2/2005 | Norfleet et al. | |
| 6,905,605 B2 | 6/2005 | Klomp | |
| 6,908,886 B2 | 6/2005 | Jones et al. | |
| 7,638,465 B2 * | 12/2009 | Rivers et al. .............. | 507/90 |
| 2003/0220202 A1 | 11/2003 | Foxenberg et al. | |
| 2005/0176591 A1 | 8/2005 | Jones et al. | |
| 2005/0261529 A1 | 11/2005 | Crosby et al. | |
| 2006/0009363 A1 | 1/2006 | Crews | |
| 2006/0027369 A1 | 2/2006 | Baycroft et al. | |
| 2006/0106265 A1 | 5/2006 | Rivers et al. | |
| 2008/0312478 A1 * | 12/2008 | Talley et al. .............. | 585/15 |

FOREIGN PATENT DOCUMENTS

WO 0177270 A1 10/2001

* cited by examiner

*Primary Examiner* — Timothy J. Kugel

(74) *Attorney, Agent, or Firm* — Mossman Kumar & Tyler

(57) ABSTRACT

Gas hydrate formation in a well completion fluid in the annular space of a hydrocarbon producing well may be controlled by the incorporation of effective amounts of one or more low dose gas hydrate inhibitors, including but not limited to, low dosage hydrate inhibitors (LDHIs), kinetic hydrate inhibitors, dendrimeric or branched compounds, linear polymers and copolymers, grafted or branched linear polymers and copolymers, and onium compounds.

32 Claims, 1 Drawing Sheet

US 8,048,827 B2

KINETIC GAS HYDRATE INHIBITORS IN COMPLETION FLUIDS

CROSS-REFERENCE TO RELATED APPLICATION

This application is a continuation-in-part of U.S. patent application Ser. No. 11/832,741 filed Aug. 2, 2007, issued as U.S. Pat. No. 7,638,465 on Dec. 29, 2009, which in turn claims the benefit of U.S. Provisional Application No. 60/835,285 filed Aug. 3, 2006.

TECHNICAL FIELD

The invention relates to methods and compositions for inhibiting the formation of hydrocarbon hydrates, and most particularly relates, in one non-limiting embodiment, to methods and compositions for inhibiting the formation of hydrocarbon hydrates during the production of oil and gas, specifically in completion fluids in one non-limiting embodiment.

BACKGROUND

A number of hydrocarbons, especially lower-boiling light hydrocarbons, in formation fluids or natural gas are known to form hydrates in conjunction with the water present in the system under a variety of conditions—particularly at a combination of lower temperature and higher pressure. The hydrates usually exist in solid forms that are essentially insoluble in the fluid itself. As a result, any solids in a formation or natural gas fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons into the environment either on-land or offshore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions.

There are two broad techniques to overcome or control the hydrocarbon hydrate problems, namely thermodynamic and kinetic. For the thermodynamic approach, there are a number of reported or attempted methods, including water removal, increasing temperature, decreasing pressure, addition of "antifreeze" to the fluid and/or a combination of these. The kinetic approach generally attempts (a) to prevent the smaller hydrocarbon hydrate crystals from agglomerating into larger ones (known in the industry as an anti-agglomerate and abbreviated AA) and/or (b) to inhibit, retard and/or prevent initial hydrocarbon hydrate crystal nucleation; and/or crystal growth (known in the industry as a kinetic hydrate inhibitor and abbreviated KHI). Thermodynamic and kinetic hydrate control methods may be used in conjunction.

Kinetic efforts to control hydrates have included the use of different materials as inhibitors. For instance, onium compounds with at least four carbon substituents are used to inhibit the plugging of conduits by gas hydrates. Additives such as polymers with lactam rings have also been employed to control clathrate hydrates in fluid systems. These kinetic inhibitors are commonly labeled Low Dosage Hydrate Inhibitors (LDHI) in the art. KHIs and even LDHIs are relatively expensive materials, and it is always advantageous to determine ways of lowering the usage levels of these hydrate inhibitors while maintaining effective hydrate inhibition.

Thus, it is desirable if new gas hydrate inhibitors were discovered which would yield comparable or improved results over known gas hydrate inhibitors, and it is also desirable to find new, unexpected applications for gas hydrate inhibitors.

SUMMARY

There is provided, in one form, a method for inhibiting formation of hydrocarbon hydrates that involves contacting a completion fluid which includes a mixture of water and hydrate-forming guest molecules at gas hydrate forming conditions with an amount of a first hydrate inhibitor that includes a first kinetic gas hydrate inhibitor (KHI) that is effective to inhibit formation of hydrocarbon hydrates at the conditions. In one non-limiting embodiment, the first KHI may be a grafted or branched linear polymer and/or a grafted or branched linear copolymer. The grafted or branched linear polymers and linear copolymers may have at least one, and alternatively may have at least two branches or grafts, and where the branches or grafts are selected from the group consisting of straight or branched alkyl groups, cyclic alkyl groups, alkylamine groups, branches derived from di-unsaturated, poly-unsaturated monomers, where the polymer or copolymer may be crosslinked as long as it remains soluble in water. In another alternate embodiment, the branched or grafted linear polymer or linear copolymer has 3 to 10 branches or grafts. The sizes of the branches or grafts should not be so large as to render the KHI insoluble in water.

In an alternative, non-restrictive version there is provided the completion fluid per se described above.

In another non-limiting embodiment herein, there is provided a hydrocarbon well that includes an annular space; and a completion fluid in the annular space. The completion fluid is inhibited against hydrocarbon hydrate formation in the presence of water at gas hydrate forming conditions. The completion fluid includes water, hydrate-forming guest molecules and a kinetic gas hydrate inhibitor in an amount effective to inhibit formation of hydrocarbon hydrates at the gas hydrate forming conditions. Again, the gas hydrate inhibitor may be any grafted or branched linear polymers and/or grafted or branched linear copolymers, as mentioned above.

DETAILED DESCRIPTION

Figure 1:
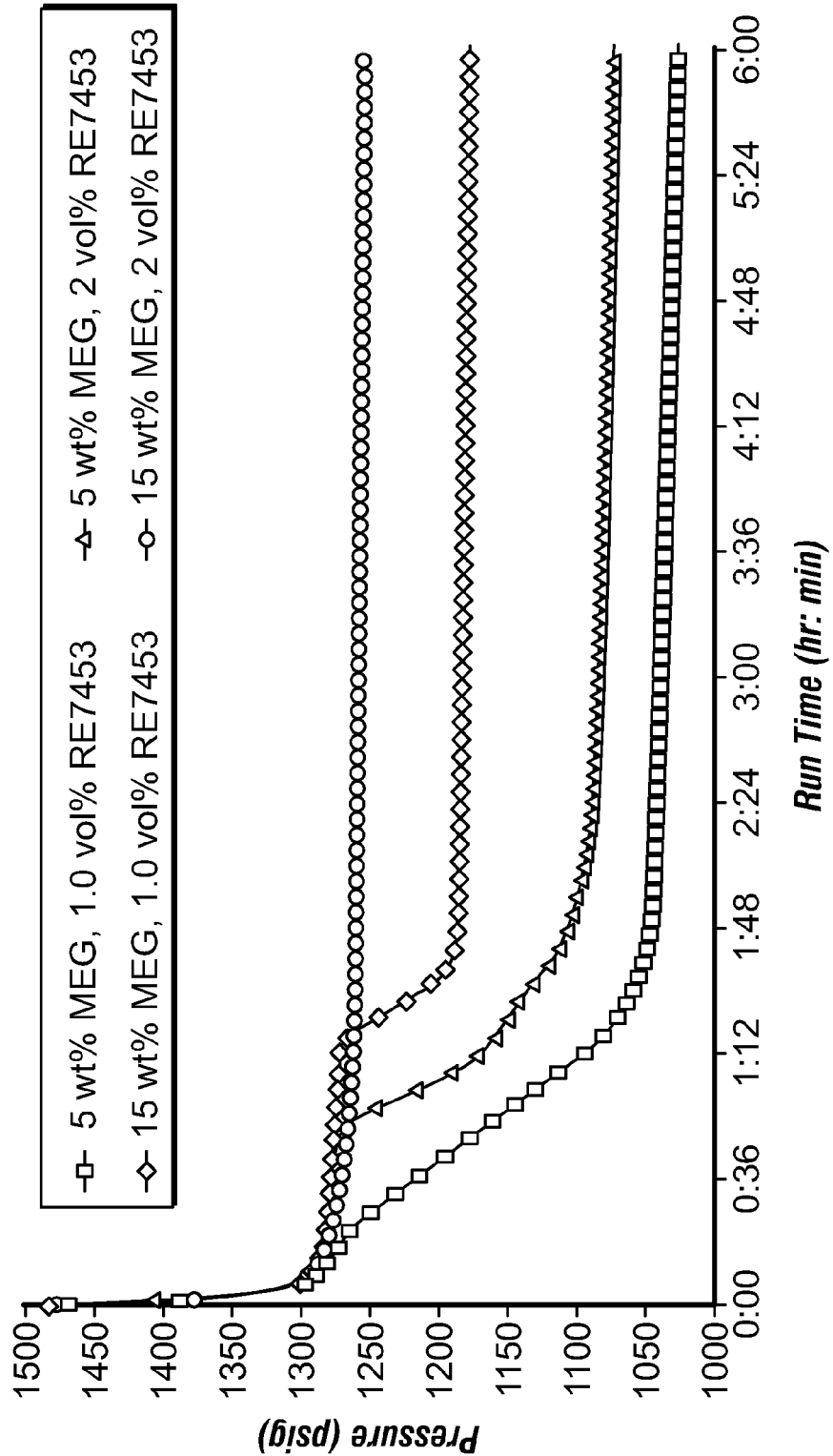
FIG. 1 is a plot of cell pressure as a function of run time for four formulations using the same test fluid with varying amounts of monoethylene glycol (MEG) and RE7453, a dendrimeric gas hydrate inhibitor herein where lower cell pressure is an indication of gas hydrate formation.

Methods and compositions have been discovered for inhibiting, retarding, mitigating, reducing, controlling and/or delaying formation of hydrocarbon hydrates or agglomerates of hydrates in completion fluids used in hydrocarbon recovery operations. The method may be applied to prevent or reduce or mitigate plugging of annular spaces, pipes, transfer lines, valves, and other places or equipment downhole where hydrocarbon hydrate solids may form under conditions conducive to their formation or agglomeration.

The term "inhibiting" is used herein in a broad and general sense to mean any improvement in preventing, controlling, delaying, reducing or mitigating the formation, growth and/or agglomeration of hydrocarbon hydrates, particularly light hydrocarbon gas hydrates in any manner, including, but not limited to kinetically, thermodynamically, by dissolution, by breaking up, by anti-agglomeration (AA) other mechanisms, or any combination thereof. Although the term "inhibiting" is not intended to be restricted to the complete cessation of gas hydrate formation, it may include the possibility that formation of any gas hydrate is entirely prevented.

The terms "formation" or "forming" relating to hydrates are used herein in a broad and general manner to include, but are not limited to, any formation of hydrate solids from water and hydrocarbon(s) or hydrocarbon and non-hydrocarbon gas(es), growth of hydrate solids, agglomeration of hydrates, accumulation of hydrates on surfaces, any deterioration of hydrate solids plugging or other problems in a system and combinations thereof.

The term "low dosage" used with respect to low dosage hydrate inhibitors (LDHIs) as defined herein refers to volumes of less than 5 volume % (vol %) of the completion fluids. In some non-limiting embodiments, the vol% for thermodynamic hydrate inhibitors may be considerably higher, which depends on both the system sub-cooling and hold time.

The present method is useful for inhibiting hydrate formation for many hydrocarbons particularly including hydrocarbon and non-hydrocarbon mixtures. The method is particularly useful for lighter or low-boiling, $C_1$-$C_5$, hydrocarbon gases, non-hydrocarbon gases or gas mixtures at ambient conditions. Examples of such gases include, but are not necessarily limited to, methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, xenon, and mixtures thereof. These molecules are also termed hydrate-forming guest molecules herein. Other examples include various natural gas mixtures that are present in many gas and/or oil formations and natural gas liquids (NGL). The hydrates of all of these low-boiling hydrocarbons are also referred to as gas hydrates. The hydrate forming guest molecules may also comprise other compounds which are not hydrocarbons including, but not limited to CO, $CO_2$, COS, hydrogen, hydrogen sulfide ($H_2S$), and other compounds commonly found in gas/oil formations or processing plants, either naturally occurring or used in recovering/processing hydrocarbons from the formation or both, and mixtures thereof.

"Completion fluids" as defined herein include solids-free liquids used to control a hydrocarbon well should downhole hardware fail. Completion fluids also help place certain completion-related equipment, such as gravel packs, without damaging the producing subterranean formation zones. Completion fluids are typically brines (e.g. chlorides, bromides, formates and the like), but could be any non-damaging fluid of the proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof. Completion fluids are placed in the annular space downhole to facilitate the final operation prior to the initiation of production of hydrocarbons from the well. Such final operations include, but are not necessarily limited to, setting screens, production lines, packers and/or downhole valves, and shooting perforations into the producing zones. Conventional drilling fluids are rarely suitable for completion operations due to their solids content, pH, and ionic composition. Drill-in fluids may occasionally be suitable for both purposes. Generally, completion fluids are specially designed to avoid damage to the reservoir formation and completion components. The completion fluid should be chemically compatible with the subterranean reservoir formation and its fluids, and should be carefully filtered to avoid introducing solids to the near-wellbore area of the formation. By "solids-free" is meant that the completion fluid is sufficiently free of solids to avoid damage to the reservoir formation and completion components. In one non-limiting embodiment, "solids-free" means that the Total Suspended Solids (TSS) is less than 0.5 volume % at the beginning of circulation through the system. TSS may increase as the completion fluid circulates depending on the conditions. Completion fluids also typically have a density between about 8.3 lb/gal to about 22 lb/gal (about 1 to about 2.6 kg/liter). Further, completion fluids also have a pH less than about 8.

Suitable gas hydrate inhibitors for use in the methods and completion fluid compositions herein may include, but are not necessarily limited to, known gas hydrate inhibitors, in particular LDHIs (in contrast to thermodynamic inhibitors such as salts or glycols), including, but not limited to cationic, anionic, amphoteric, and non-ionic LDHIs. Alternatively, the LDHI may be a kinetic hydrate inhibitor in one non-limiting embodiment, as opposed to anti-agglomerates.

Another particularly useful group of hydrate inhibitors include dendrimeric compounds and in particular hyperbranched polyester amides. Dendrimeric compounds are in essence three-dimensional, highly branched oligomeric or polymeric molecules comprising a core, a number of branching generations and an external surface composed of end groups. A branching generation is composed of structural units which are bound radially to the core or to the structural units of a previous generation and which extend outward from the core. The structural units may have at least two reactive monofunctional groups and/or at least one monofunctional group and one multifunctional group. The term "multifunctional" is understood as having a functionality of about 2 or higher. To each functionality a new structural unit may be linked, a higher branching generation being produced as a result. The structural units can be the same for each successive generation but they can also be different. The degree of branching of a particular generation present in a dendrimeric compound is defined as the ratio between the number of branchings present and the maximum number of branchings possible in a completely branched dendrimer of the same generation. The term "functional end groups" of a dendrimeric compound refers to those reactive groups which form part of the external surface. Branchings may occur with greater or lesser regularity and the branchings at the surface may belong to different generations depending on the level of control exercised during synthesis. Dendrimeric compounds may have defects in the branching structure, may also be branched asymmetrically or have an incomplete degree of branching in which case the dendrimeric compound is said to contain both functional groups and functional end groups. In one non-limiting embodiment herein, the term "highly branched" may refer to three-dimensional structures that contain a combination of at least 5 functional groups and/or at least 5 functional end groups. Alternatively or in addition to these parameters, "highly branched" dendrimeric compounds may have a number average molecular weight in the range of from about 1000 to about 5000, with a molecular weight distribution of as broad as about 2 to about 30.

Dendrimeric compounds have also been referred to as "starburst conjugates". Such compounds are described as being polymers characterized by regular dendrimeric (tree-like) branching with radial symmetry.

Functionalized dendrimeric compounds are characterized by one or more of the reactive functional groups present in the dendrimeric compounds having been allowed to react with active moieties different from those featured in the structural units of the starting dendrimeric compounds. These moieties can be selectively chosen such that, with regard to its ability to prevent the growth or agglomeration of hydrate crystals, the functionalized dendrimeric compound out performs the dendrimeric compound. All of these LDHIs are more fully described in U.S. Pat. No. 6,905,605 which is incorporated by reference herein in its entirety.

In addition to dendrimeric oligomers or polymers, suitable gas hydrate inhibitors also include linear polymers and copolymers, such as polymers and copolymers of vinylcaprolactam and/or vinylpyrrolidone, or "onium" compounds such as tetrabutylammonium bromide. Acceptable onium compounds include those mentioned in U.S. Patent Application Publication 2005/0261529 A1, incorporated by reference herein in its entirety.

Other suitable kinetic hydrate inhibitors include, but are not necessarily limited to, grafted or branched linear polymers and copolymers have at least one branch or graft thereon, and where the branches or grafts include, but are not necessarily limited to, straight or branched alkyl groups, cyclic alkyl groups, alkylamine groups, branches derived from di-unsaturated, poly-unsaturated monomers, where the polymer or copolymer may be crosslinked as long as the KHI remains soluble in water. Suitable di-unsaturated monomers include, but are not necessarily limited to, methylene-bis-acrylamide, (poly)ethylene glycol di-(meth)acrylate, divinylbenzene and combinations thereof. Suitable polyunsaturated monomers include, but are not necessarily limited to, trimethylolpropane tri(meth)acrylate, glycerin tri(meth)acrylate, ethoxylated or propoxylated trimethylolpropane or glycerin tri(meth)acrylate, melamine tri(meth)acrylate and combinations thereof. In another alternate embodiment, the branched or grafted linear polymer or copolymer has two branches or grafts, and in another non-restrictive version, 3 to 10 branches or grafts. The sizes of the branches or grafts should not be so large as to render the KHI insoluble in water. In another alternate embodiment, they have from 4 to 500 carbon atoms, alternatively from 4 to 100 carbon atoms. Alternatively or in addition to these parameters, grafted or branched linear polymers or copolymers may have a number average molecular weight in the range of from about 1000 to about 5000, with a molecular weight distribution of as broad as about 2 to about 30. Alternatively, the molecular weight range is from about 500 to about 20,000 or any combination of these lower and upper thresholds. The branched or grafted linear polymers and copolymers are distinct from dendrimeric compounds because they have branches or grafts that extend from or are attached to a generally linear polymer or copolymer backbone whereas dendrimeric compounds, as described above, have branches that extend radially outward from a core. The branches or grafts themselves may be somewhat similar, for instance, the branches or grafts may have functional end groups that are the same as those described above for the dendrimeric compounds.

The contacting of the gas hydrate inhibitors herein with the mixture of hydrocarbon, water and hydrate-forming guest molecules may be achieved by a number of ways or techniques, including, but not necessarily limited to, mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition in the mixture. The contacting may be made in-line or offline or both. The various components of the composition may be mixed prior to or during contact, or both. As discussed, if needed or desired, the composition or some of its components may be optionally removed or separated mechanically, chemically, or by other methods known to one skilled in the art, or by a combination of these methods after the hydrate formation conditions are no longer present.

Because the present compositions and methods are particularly suitable for lower boiling hydrocarbons or hydrocarbon and/or non-hydrocarbon gases at ambient conditions with no more than five carbon atoms, the pressure of the hydrate-forming condition is usually at or greater than atmospheric pressure (i.e. greater than or equal to about 101 kPa), preferably greater than about 1 MPa, and more preferably greater than about 5 MPa. The pressure in certain formations or processing plants or units could be much higher, say greater than about 20 MPa. There is no specific high pressure limit. The present method may be used at any pressure that allows formation of hydrocarbon gas hydrates.

The temperature of the condition for contacting is usually below, the same as, or not much higher than, the ambient or room temperature. Lower temperatures tend to favor hydrate formation, thus requiring the treatment with the compositions described herein. At much higher temperatures, however, hydrocarbon hydrates may not form, thus obviating the need of carrying out any treatments.

It will be appreciated that it may be difficult to predict in advance the proportions of gas hydrate inhibitors herein effective in inhibiting hydrocarbon hydrate formations in completion fluids any given situation. There are a number of complex, interrelated factors that must be taken into account in determining the effective dosage or proportion, including, but not necessarily limited to, the proportion of water in the completion fluid, the nature of the hydrocarbon, the nature of the hydrate-forming guest molecules, the temperature and pressure conditions that the mixture of hydrocarbon and water are subject to, the particular hydrocarbon hydrate inhibitor employed, etc. Experimentation with a particular set of conditions or in a specific system may be a suitable way to determine the optimum dosage range. Care should be taken to avoid the formation of problematic quantities of irreversible, harmful hydrate masses. Nevertheless, in the interest of attempting to provide some general guidance of effective proportions, relative to the water phase, the amount of the dendrimeric hydrate inhibitor is about 10 volume % or less, alternatively 8 volume % or less, and in another non-limiting embodiment is less than 6 vol %. In one non-limiting embodiment the lower limit is independently about 0.01 volume %, and alternatively is about 0.1 vol % and possibly is about 0.5 vol %. The other hydrate inhibitor types, such as the grafted or branched linear polymer and copolymer KHIs, may be added in similar doses.

Combinations of hydrate inhibitors may be used. In a non-limiting example, a first hydrate inhibitor may include a first KHI that is a grafted or branched linear polymer or copolymer, but also a second KHI that is an ungrafted or unbranched linear polymer or copolymer. Similarly, a first hydrate inhibitor may include a first KHI that is a grafted or branched linear polymer or copolymer and a second KHI different from the first KHI. A second hydrate inhibitor may also include, but not necessarily be limited to, up to about 5 wt % based on the completion fluid of a low dose hydrate inhibitor (LDHI), up to about 30 wt %, based on the completion fluid, of a thermodynamic hydrate inhibitor (THI), an anti-agglomeration (AA) agent, and combinations of these. If the second hydrate inhibitor is an AA agent, it may be an onium compound, as previously described, and may be present in an amount of from about 0.5 to about 5 wt % based on the completion fluid. If the second hydrate inhibitor is a dendrimeric or hyperbranched KHI, it may be present in an amount from about 0.5 to about 5 wt %, based on the completion fluid. If the second hydrate inhibitor is a THI, it may be present in an amount up to 50 wt %, based on the completion fluid.

In one non-limiting embodiment, the density of the completion fluid may range from about between about 8.3 lb/gal to about 22 lb/gal (about 1 to about 2.6 kg/liter).

In addition to the gas hydrate inhibitor herein, the hydrocarbon inhibitor composition and the completion fluid may further comprise other additional components, including, but not limited to, different controlling or inhibiting chemistries such as corrosion inhibitors, wax inhibitors, scale inhibitors, asphaltene inhibitors and other gas hydrate inhibitors and/or organic solvents. Suitable solvents for the gas hydrate inhibitors herein may include, but are not limited to water; at least one oxygenated compound selected from $C_1$-$C_6$ alcohols, $C_2$-$C_6$ glycols (e.g. mono-ethylene glycol or MEG), $C_1$-$C_6$ mono-aliphatic, preferably mono-alkyl, ethers of $C_2$-$C_6$ glycol, glycerin, $C_1$-$C_6$ mono-aliphatic, particularly mono-alkyl, ethers of glycerin, $C_1$-$C_6$ di-aliphatic, particularly dialkyl, ethers of glycerin, glycerin esters of $C_1$-$C_6$ carboxylate; tetrahydrofuran; N-methylpyrrolidone; sulfolane; $C_3$-$C_{10}$ ketones, and mixtures thereof. Examples of acceptable solvents in one non-limiting embodiment include water and liquid oxygenated materials such as methanol, ethanol, propanol, glycols like ethylene glycol, 1,2-propylene glycol, 1,3-propylene glycol, glycerin, esters and ethers of glycerin, CELLOSOLVE® (2-ethoxyethanol), CELLOSOLVE derivatives, 2-propoxyethanol, 2-isopropoxyethanol, 2-butoxyethanol, 2-isobutoxyethanol, 2-methoxyethanol, ethoxylated propylene glycols, ketones such as cyclohexanone and diisobutylketone, and mixtures thereof. The solvent may be present in the total hydrocarbon hydrate inhibiting composition in the range of from 0 wt % to about 85 wt %, preferably from about 0 wt % to about 65 wt %, of the total composition, based on volume. CELLOSOLVE is a registered trademark of Union Carbide Corporation.

Because some of the gas hydrate inhibitor disclosed herein will be solids or gummy-like amorphous organic materials under ambient conditions, it is often helpful to use a suitable solvent as described above in the composition. This allows the formation of a homogeneous or uniform solution, suspension, emulsion or a combination of these, of all the components for easier mixing or distributing or dispersing the composition in the hydrocarbon/water completion fluid or system to be treated. As a result, more efficient and/or favorable contacting of the composition with the mixture comprising water and the hydrate-forming guest molecules can be effected.

The present invention also may be used in combination with other methods or processes, which have been known to one skilled in the art as discussed in the background to help inhibit formation of hydrates.

EXAMPLES

In a 18 ml sapphire rocking cell were placed 12 ml of test fluid. The cell was pressurized to 1500 psig (10.3 MPa) at room temperature with a 85/15 molar ratio of methane and propane gas. The cell was quickly cooled to 38° F. (3.3° C.) (shock cooled). FIG. 1 presents the plots of cell pressure vs. time for four Examples. A lower pressure shows that gas is lost due to hydrate formation. The data show that, as expected, monoethylene glycol (MEG), inhibits hydrate formation. The data also show that RE7453, a dendrimeric compound as described herein, inhibits gas hydrate formation. That is, higher pressure, meaning less gas hydrate formation, occurred in each instance where the proportion of RE7453 increased from 1 wt % to 2 wt % and the amount of MEG remained the same. RE7453 is a low dose, dendrimeric hydrate inhibitor available from Baker Hughes. These tests were performed with a 10 wt % sodium bromide brine. The glycol was added as a thermodynamic gas hydrate inhibitor and the RE7453 was added as a LDHI.

Many modifications may be made in the compositions and methods of this invention without departing from the spirit and scope thereof that are defined only in the appended claims. For example, the exact grafted or branched linear polymers or grafted or branched linear copolymers may be different from those explicitly mentioned herein. For instance, it should be understood that the linear polymers and copolymers may be both grafted and branched. Various combinations of gas hydrate inhibitors alone or together other than those described here are also expected to be useful. Further, grafted or branched linear polymers or copolymers used alone or together with other known hydrated inhibitors, mixtures of water, hydrocarbons and hydrate-forming guest molecules different from those exemplified herein would be expected to be successful within the context of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:
1. A method for inhibiting formation of hydrates comprising:
contacting a completion fluid including:
brine; and
hydrate-forming guest molecules that form hydrates at hydrate forming conditions, where the hydrate-forming guest molecule comprises at least one selected from the group consisting of methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon,
with an amount of a first hydrate inhibitor comprising a first kinetic hydrate inhibitor (KHI) effective to inhibit formation of hydrates at the hydrate forming conditions, where the first kinetic hydrate inhibitor is selected from the group consisting of grafted linear polymers, branched linear polymers, grafted linear copolymers, branched linear copolymers, and combinations thereof.

2. The method of claim 1 further comprising contacting the completion fluid with at least one second hydrate inhibitor selected from the group consisting of:
- up to about 5 wt % based on the completion fluid of a low dose hydrate inhibitor (LDHI);
- up to about 30 wt %, based on the completion fluid, of a thermodynamic hydrate inhibitor (THI);
- an anti-agglomeration (AA) agent;
- another KHI different from the first KHI; and
- combinations thereof.

3. The method of claim 2 where the second hydrate inhibitor is an AA agent and is an onium compound present in an amount from 0.5 to 5 wt % based on the completion fluid.

4. The method of claim 2 where the second hydrate inhibitor is a dendrimeric or hyperbranched KHI present in an amount from about 0.5 to about 10 wt % based on the completion fluid.

5. The method of claim 2 where the second hydrate inhibitor is a THI present in an amount up to 50 wt % based on the completion fluid.

6. The method of claim 1 where in the first KHI, the grafted or branched linear polymers and copolymers have at least one branch or graft, and where the branches or grafts are selected from the group consisting of straight or branched alkyl groups, cyclic alkyl groups, alkylamine groups, branches derived from di-unsaturated and poly-unsaturated monomers, where the polymer or copolymer may be crosslinked as long as it remains soluble in water.

7. The method of claim 1 where the first hydrate inhibitor further comprises a second KHI selected from the group consisting of ungrafted or unbranched linear polymers and copolymers.

8. The method of claim 1 where the density of the completion fluid ranges between about 8.3 lb/gal to about 22 lb/gal.

9. The method of claim 1 where the completion fluid further comprises an additional component selected from the group consisting of monoethylene glycol, glycerin, organic solvents and combinations thereof.

10. The method of claim 1 where the amount of the first kinetic hydrate inhibitor in the completion fluid ranges from about 0.01 to about 10 volume % based on the water present.

11. A method for inhibiting formation of hydrates comprising:
- contacting a completion fluid including:
  - brine; and
  - hydrate-forming guest molecules that form hydrates at hydrate forming conditions, where the hydrate-forming guest molecule comprises at least one selected from the group consisting of methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon,
- with from about 0.01 to about 10 volume % based on the water present of a first hydrate inhibitor comprising a first kinetic hydrate inhibitor (KHI) effective to inhibit formation of hydrates at the hydrate forming conditions, where the first kinetic hydrate inhibitor is selected from the group consisting of grafted linear polymers, branched linear polymers, grafted linear copolymers, branched linear copolymers, and combinations thereof, where the monomers for the polymers are selected from the group consisting of methylene-bis-acrylamide, (poly)ethylene glycol di-(meth)acrylate, divinylbenzene, trimethylolpropane tri(meth)acrylate, glycerin tri(meth)acrylate, ethoxylated trimethylolpropane, propoxylated trimethylolpropane, ethoxylated and propoxylated trimethylolpropane, ethoxylated glycerin tri(meth)acrylate, propoxylated tri(meth)acrylate, ethoxylated and propoxylated tri(meth)acrylate, melamine tri(meth)acrylate and combinations thereof; and
- at least one second hydrate inhibitor selected from the group consisting of:
  - up to about 5 wt % based on the completion fluid of a low dose hydrate inhibitor (LDHI);
  - up to about 30 wt %, based on the completion fluid, of a thermodynamic hydrate inhibitor (THI);
  - an anti-agglomeration (AA) agent;
  - another KHI different from the first KHI; and
  - combinations thereof.

12. A completion fluid comprising:
- brine,
- hydrate-forming guest molecules, where the hydrate-forming guest molecule comprises at least one selected from the group consisting of methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon; and
- a first hydrate inhibitor comprising a first kinetic hydrate inhibitor (KHI) in an amount effective to inhibit formation of hydrates at hydrate forming conditions, where the kinetic hydrate inhibitor is selected from the group consisting of grafted linear polymers, branched linear polymers, grafted linear copolymers, branched linear copolymers, and combinations thereof;

where the completion fluid has less than 0.5 vol % total suspended solids (TSS).

13. The completion fluid of claim 12 further comprising at least one second hydrate inhibitor selected from the group consisting of:
- up to about 5 wt % based on the completion fluid of a low dose hydrate inhibitor (LDHI);
- up to about 30 wt %, based on the completion fluid, of a thermodynamic hydrate inhibitor (THI);
- an anti-agglomeration (AA) agent;
- another KHI different from the first KHI; and
- combinations thereof.

14. The completion fluid of claim 13 where the second hydrate inhibitor is an AA agent and is an onium compound present in an amount from 0.5 to 5 wt % based on the completion fluid.

15. The completion fluid of claim 13 where the second hydrate inhibitor is a dendrimeric or hyperbranched KHI present in an amount from 0.5 to 10 wt % based on the completion fluid.

16. The completion fluid of claim 13 where the second hydrate inhibitor is a THI present in an amount up to 50 wt % based on the completion fluid.

17. The completion fluid of claim 12 where in the first KHI, the grafted or branched linear polymers and copolymers have at least two branches or grafts, and where the branches or grafts are selected from the group consisting of straight or branched alkyl groups, cyclic alkyl groups, alkylamine groups, branches derived from di-unsaturated and poly-unsaturated monomers, where the polymer or copolymer may be crosslinked as long as it remains soluble in water.

18. The completion fluid of claim 12 where the first hydrate inhibitor further comprises a second KHI selected from the group consisting of ungrafted or unbranched linear polymers and copolymers.

19. The completion fluid of claim 12 where the density of the completion fluid ranges between about 8.3 lb/gal to about 22 lb/gal.

20. The completion fluid of claim 12 further comprising an additional component selected from the group consisting of monoethylene glycol, glycerin, organic solvents and combinations thereof.

21. The completion fluid of claim 12 where the amount of the first KHI ranges from about 0.01 to about 10 volume % based on the water present.

22. The completion fluid of claim 12 where the first KHI is present in a solvent selected from the group consisting of an oxygenated compound selected from the group consisting of $C_1$-$C_6$ alcohols, $C_2$-$C_6$ glycols, $C_1$-$C_6$ mono-aliphatic glycerin, $C_1$-$C_6$ mono-aliphatic ethers of glycerin, $C_1$-$C_6$ di-aliphatic ethers of glycerin, glycerin esters of $C_1$-$C_6$ carboxylate, tetrahydrofuran, N-methylpyrrolidone, sulfolane, $C_3$-$C_{10}$ ketones, and mixtures thereof.

23. A hydrocarbon well comprising:
   an annular space; and
   a solids-free completion fluid in the annular space, the solids-free completion fluid being inhibited against hydrate formation in the presence of water at hydrate forming conditions, and the solids-free completion fluid comprising
   brine;
   hydrate-forming guest molecules, where the hydrate-forming guest molecule comprises at least one selected from the group consisting of methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon; and
   at least a first hydrate inhibitor comprising at least one first kinetic hydrate inhibitor (KHI) in an amount effective to inhibit formation of hydrates at the hydrate forming conditions, where the first KHI is selected from the group consisting of grafted or branched linear polymers and grafted or branched copolymers.

24. The hydrocarbon well of claim 23 where the completion fluid further comprises at least one second hydrate inhibitor selected from the group consisting of:
   up to about 5 wt % based on the completion fluid of a low dose hydrate inhibitor (LDHI);
   up to about 30 wt %, based on the completion fluid, of a thermodynamic hydrate inhibitor (THI);
   an anti-agglomeration (AA) agent;
   another KHI different from the first KHI; and
   combinations thereof.

25. The hydrocarbon well of claim 24 where the second hydrate inhibitor is an AA agent is an onium compound present in an amount from about 0.5 to about 5 wt % based on the completion fluid.

26. The hydrocarbon well of claim 24 where the second hydrate inhibitor is a dendrimeric or hyperbranched KHI present in an amount from about 0.5 to about 10 wt % based on the completion fluid.

27. The hydrocarbon well of claim 24 where the second hydrate inhibitor is a THI present in an amount up to about 50 wt % based on the completion fluid.

28. The hydrocarbon well of claim 23 where in the first KHI, the grafted or branched linear polymers and copolymers have at least two branches or grafts, and where the branches or grafts are selected from the group consisting of straight or branched alkyl groups, cyclic alkyl groups, alkylamine groups, branches derived from di-unsaturated and poly-unsaturated monomers, where the polymer or copolymer may be crosslinked as long as it remains soluble in water.

29. The hydrocarbon well of claim 23 where the first hydrate inhibitor further comprises a second KHI selected from the group consisting of ungrafted or unbranched linear polymers and copolymers.

30. The hydrocarbon well of claim 23 where the density of the completion fluid ranges between about 8.3 lb/gal to about 22 lb/gal.

31. The hydrocarbon well of claim 23 where the completion fluid further comprises an additional component selected from the group consisting of monoethylene glycol, glycerin, organic solvents and combinations thereof.

32. The hydrocarbon well of claim 23 where the amount of the first KHI in the solids-free completion fluid ranges from about 0.01 to about 10 volume % based on the water present.

* * * * *